US009857831B2

(12) United States Patent
Senatori et al.

(10) Patent No.: US 9,857,831 B2
(45) Date of Patent: Jan. 2, 2018

(54) FLEXIBLE HINGES FOR COMPUTING DEVICES

(71) Applicant: HEWLETT-PACKARD DEVELOPMENT COMPANY, L.P., Houston, TX (US)

(72) Inventors: Mark David Senatori, Houston, TX (US); Insun Hong, Houston, TX (US); Dimitre Mehandjiysky, Houston, TX (US); Kevin L Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/026,333

(22) PCT Filed: Nov. 15, 2013

(86) PCT No.: PCT/US2013/070286
§ 371 (c)(1),
(2) Date: Mar. 31, 2016

(87) PCT Pub. No.: WO2015/073020
PCT Pub. Date: May 21, 2015

(65) Prior Publication Data
US 2016/0252930 A1    Sep. 1, 2016

(51) Int. Cl.
*G06F 1/16*    (2006.01)
(52) U.S. Cl.
CPC .......... *G06F 1/1616* (2013.01); *G06F 1/162* (2013.01); *G06F 1/1637* (2013.01);
(Continued)

(58) Field of Classification Search
CPC .... G06F 1/1681; G06F 1/1616; G06F 1/1679; G06F 1/162; G06F 1/1637; G06F 1/1683; G06F 1/166
See application file for complete search history.

(56) References Cited

U.S. PATENT DOCUMENTS 6,266,236 B1    7/2001    Ku et al.
6,903,927 B2    6/2005    Anlauff
(Continued)

FOREIGN PATENT DOCUMENTS

JP    2013-030054 A    2/2013
KR    20-2012-0008365    12/2012
TW    393597 A    6/2000

OTHER PUBLICATIONS

Nosowitz, D.; "Acer Announces Wierd Folding Laptop with the Trackpad in the Wrong Place"; May 3, 2013.
(Continued)

*Primary Examiner* — James Wu
(74) *Attorney, Agent, or Firm* — HP Inc Patent Department

(57) ABSTRACT

A computing device may include a base member, a display member, a first hinge, and a second hinge. The first hinge may be attached to the base member to rotate the base member and the display member relative to each other about a first pivotal axis of rotation. The second hinge may be attached between the first hinge and the display member. The second hinge may be flexible to bend about a second pivotal axis of rotation to rotate the base member and the display member relative to each other about the second pivotal axis to transition the computing device between a laptop mode and a tablet mode.

12 Claims, 8 Drawing Sheets

(52) U.S. Cl.
CPC ............ *G06F 1/1681* (2013.01); *G06F 1/166* (2013.01); *G06F 1/1679* (2013.01); *G06F 1/1683* (2013.01)

(56) References Cited

U.S. PATENT DOCUMENTS

| | | | | |
|---|---|---|---|---|
| 7,035,090 B2* | 4/2006 | Tanaka | ................. | G06F 1/162 345/169 |
| 8,438,702 B2 | 5/2013 | Apgar et al. | | |
| 2003/0112589 A1 | 6/2003 | Shimano et al. | | |
| 2004/0114315 A1* | 6/2004 | Anlauff | ................. | G06F 1/162 361/679.28 |
| 2005/0105263 A1* | 5/2005 | Tanaka | ................. | G06F 1/162 361/679.06 |
| 2006/0077622 A1* | 4/2006 | Keely | ................. | G06F 1/1616 361/679.09 |
| 2012/0037285 A1* | 2/2012 | Diebel | ................. | A45C 11/00 150/165 |
| 2012/0074291 A1* | 3/2012 | Fu | ................. | F16M 11/10 248/560 |
| 2012/0176741 A1 | 7/2012 | Wu et al. | | |
| 2012/0194977 A1* | 8/2012 | Liu | ................. | G06F 1/162 361/679.01 |
| 2013/0010405 A1 | 1/2013 | Rothkopf et al. | | |
| 2013/0214661 A1* | 8/2013 | McBroom | ............. | G06F 1/1667 312/325 |
| 2013/0242490 A1 | 9/2013 | Ku | | |
| 2014/0185196 A1* | 7/2014 | Oakley | ................. | G06F 1/1616 361/679.01 |
| 2016/0109909 A1* | 4/2016 | Kim | ................. | G06F 1/1616 361/679.55 |

OTHER PUBLICATIONS

Verry, T.; "Sony Launches VAIO Duo 11 convertible Tablet Ultrabook Running Windows 8" Jun. 3, 2013.

* cited by examiner

FLEXIBLE HINGES FOR COMPUTING DEVICES

BACKGROUND

Various mobile computing devices are available such as laptops and tablets. A laptop may include a display and a physical input device separate from the display. A tablet computer may be a one-piece mobile device having a touchscreen that may be navigated by a fingertip or stylus.

BRIEF DESCRIPTION OF THE DRAWINGS

Some examples are described with respect to the following figures.

DETAILED DESCRIPTION

Figure 1A:
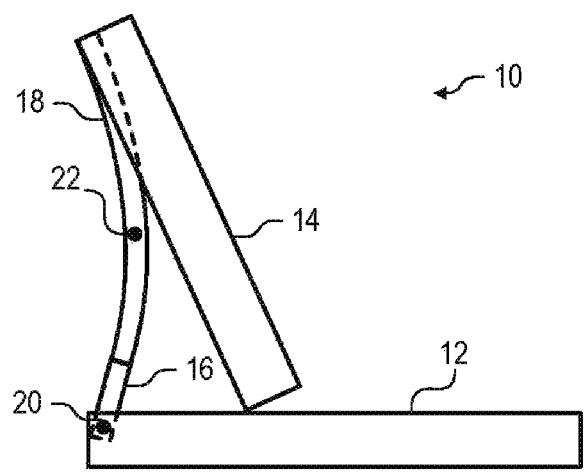
FIG. 1A is a side view of a computing device in a tablet mode according to some examples.

The following terminology is understood the mean the following when recited by the specification or the claims. The singular forms "a," "an," and "the" mean "one or more." The term "attached" includes both direct forms of attachment and indirect forms of attachment such as where one or more intervening elements may be included between the parts being attached. The terms "including" and "having" are intended to have the same inclusive meaning as the term "comprising."

Some existing computing devices having multiple modes of operation may have expensive and unwieldy design, and may not adequately provide desired multi-purpose capabilities. Accordingly, the present disclosure concerns computing devices having flexible hinges.

In some examples, the computing devices of the present disclosure that can be transitioned between a "laptop mode" to operate as a laptop and a "tablet mode" to operate as a tablet. In some examples, the computing devices may also include a "closed mode" in which the computing device is closed, for example when the display screen and the keyboard inwardly face each other. However, in other examples, a closed mode may not be included. The term "computing device" encompasses any device with computing capability. The term "laptop" encompasses any of a number of different computing devices having a display screen and a separate input device such as a keyboard. The term "tablet" encompasses any of a number of different computing devices having a display screen that operates as a touchscreen that can be navigated by an input stimulus such as a fingertip or stylus.

The computing device may include a display member attached to a base member via a hinge assembly having a flexible hinge and a friction hinge. The flexible hinge may be attached to the display member, and the friction hinge may be attached to the base member. A "hinge" allows two elements attached to the hinge to be rotated relative to each other about a pivotal axis of rotation. An element that is "flexible" has suitable dimensions and/or is made of suitable materials such that the element is capable of bending without breaking. Conversely, an element that is "rigid" has suitable dimensions and/or is made of suitable materials such that it cannot be bent without breaking.

The display member may pivot about two pivotal axes of rotation relative to the base member. The two pivotal axes may operate independently of each other. The computing device may be transitioned between its modes using the two pivotal axes, as follows.

In the closed mode, the display member may be stacked in parallel on the base member such that a display screen of the display member and a keyboard of the base member are facing inwardly toward each other. In the laptop mode, the display member may be oriented at an angle, for example an obtuse angle, relative to the base member to allow the user to view a display screen of the display member. A user may transition the computing device between the closed mode and the laptop mode by rotating the display member about the first pivotal axis of rotation, which may be implemented by the friction hinge. In the tablet mode, the display member may be oriented such that the display screen is facing outwardly away from the base member, and such that the keyboard of the base member is facing inwardly toward the back side of the display member. The display screen may be used as a touchscreen that may be navigated by a fingertip or stylus. The user may transition the computing device between the laptop mode and the tablet mode by rotating the display member about the second pivotal axis of rotation, which may be implemented by the flexible hinge.

The present disclosure may, in some examples, provide a thin solution and a cost-effective design. For example, the flexible hinge itself may be thin, and a flexible flat cable may be provided in the flexible hinge to allow for reduced thickness of the hinge assembly. Additionally, the flexible hinge may be exposed in that there may be no housing or cover material needed for housing the flexible hinge.

Figure 1B:
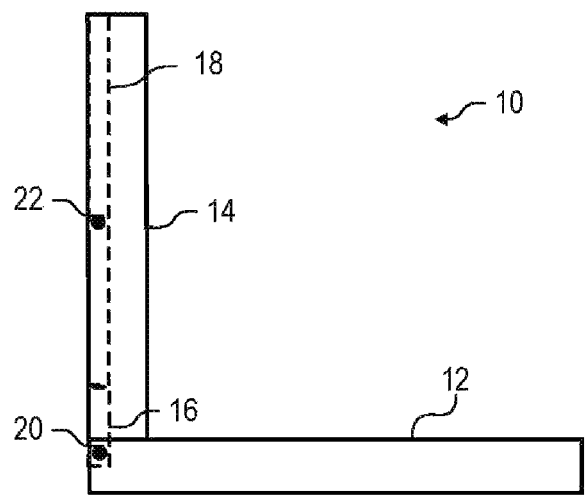
FIG. 1B is a side view of a computing device in a laptop mode according to some examples.

FIG. 1A is a side view of a computing device 10 in a tablet mode according to some examples, and FIG. 1B is a side view of the computing device 10 in a laptop mode according to some examples. The computing device 10 may include a base member 12, a display member 14, a first hinge 16, and a second hinge 18. The first hinge 16 may be attached to the base member 12 to rotate the base member 12 and the display member 14 relative to each other about a first pivotal axis of rotation 20. The second hinge 18 may be attached between the first hinge 16 and the display member 14. The second hinge 18 may be flexible to bend about a second pivotal axis of rotation 22 to rotate the base member 12 and the display member 14 relative to each other about the second pivotal axis 22 to transition the computing device 10 between a laptop mode and a tablet mode.

Figure 2A:
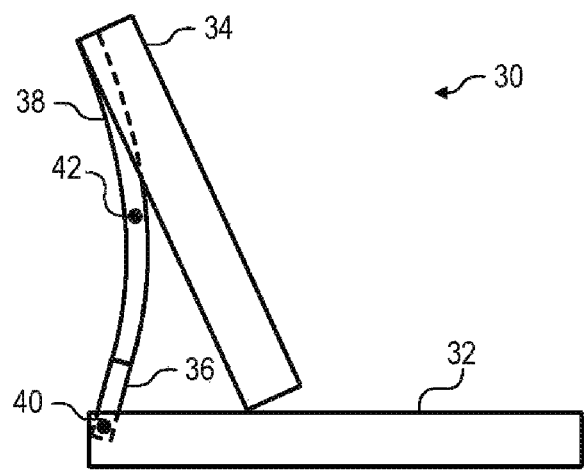
FIG. 2A is a side view of a computing device in a tablet mode according to some examples.
Figure 2B:
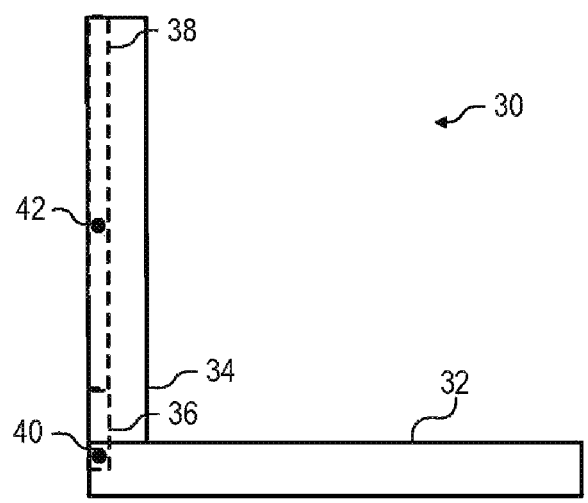
FIG. 2B is a side view a computing device in a laptop mode according to some examples.

FIG. 2A is a side view of a computing device 30 in a tablet mode according to some examples, and FIG. 2B is a side view of the computing device 30 in a laptop mode according to some examples. The computing device 30 may include a base member 32, a display member 34, a first hinge 36, and a second hinge 38. The first hinge 36 may be attached to the base member 32. The second hinge 38 may be attached between the first hinge 36 and the display member 34. The first hinge 36 may be to rotate about a first pivotal axis of rotation 40 and the second hinge 38 may be flexible to bend about a second pivotal axis of rotation 42 to rotate the base member 32 and the display member 34 relative to each other about the first and second pivotal axes 40 and 42 to transition the computing device 30 between a laptop mode and a tablet mode.

Figure 3A:
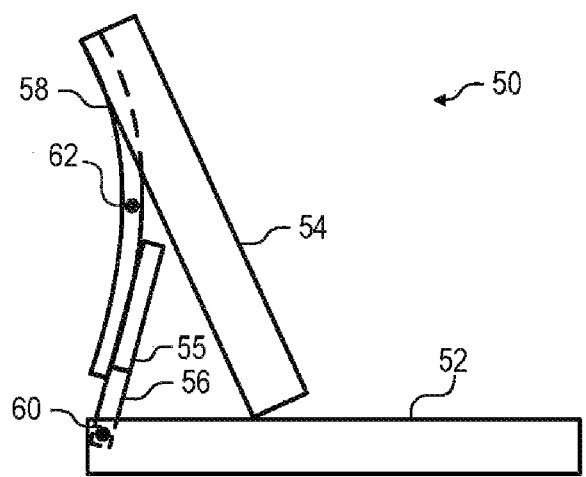
FIG. 3A is a side view of a computing device in a tablet mode according to some examples.
Figure 3B:
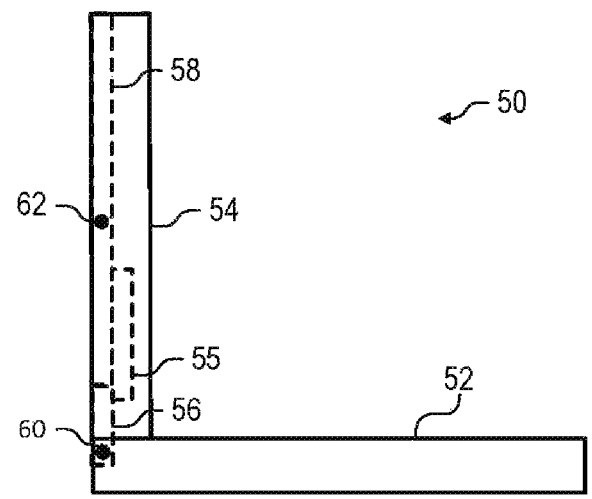
FIG. 3B is a side view of a computing device in a laptop mode according to some examples.

FIG. 3A is a side view of a computing device 50 in a tablet mode according to some examples, and FIG. 3B is a side view of the computing device 50 in a laptop mode according to some examples. The computing device 50 may include a base member 52, a display member 54, a rigid plate 55, a first hinge 56, and a second hinge 58. The first hinge 56 may be attached between the base member 52 and the rigid plate 36 to rotate the base member 52 relative to the rigid plate 55 about a first pivotal axis of rotation 60. The second hinge 58 may be attached between the display member 54 and the rigid plate 55. The second hinge 58 may be flexible to bend about a second pivotal axis of rotation 62 to rotate the display member 54 relative to the rigid plate 55 about the second pivotal axis 62 to transition the computing device 50 between a laptop mode and a tablet mode.

FIG. 4-8 respectively are perspective views of a computing device 100 in a closed mode, laptop mode, rear position of a tablet mode, front position of the tablet mode, and compressed position of the tablet mode according to some examples.

The computing device 100 may include a base member 102 and a display member 104. The base member 102 may have a first side 106 and a second side 108. The base member 102 may include input devices such as a keyboard 107 and a touchpad 109 housed on the first side 106. In some examples, the base member 102 may be a capacitive keyboard. The display member 104 may have a first side 110 and a second side 112. The display member 104 may include a display screen 114 housed on the first side 110. The display screen 114 may be liquid-crystal display (LCD) and/or may be touch-enabled to allow navigation by a fingertip or stylus. In some examples, the display screen 114 may not be touch-enabled. The display member 104 may also include a camera, speakers, and/or antennas, for example. One or both of the base member 102 and the display member 104 may house a processor and a memory. The computing device 100 may include a hinge assembly 116, which may extend from a first end 118 to an opposing second end 120. The hinge assembly 116 may include a flexible hinge 122, a rigid plate 124, display attachment portion 123, plate attachment portion 127, a cable 125, hinges 126, and a display cover 113.

Figure 6:
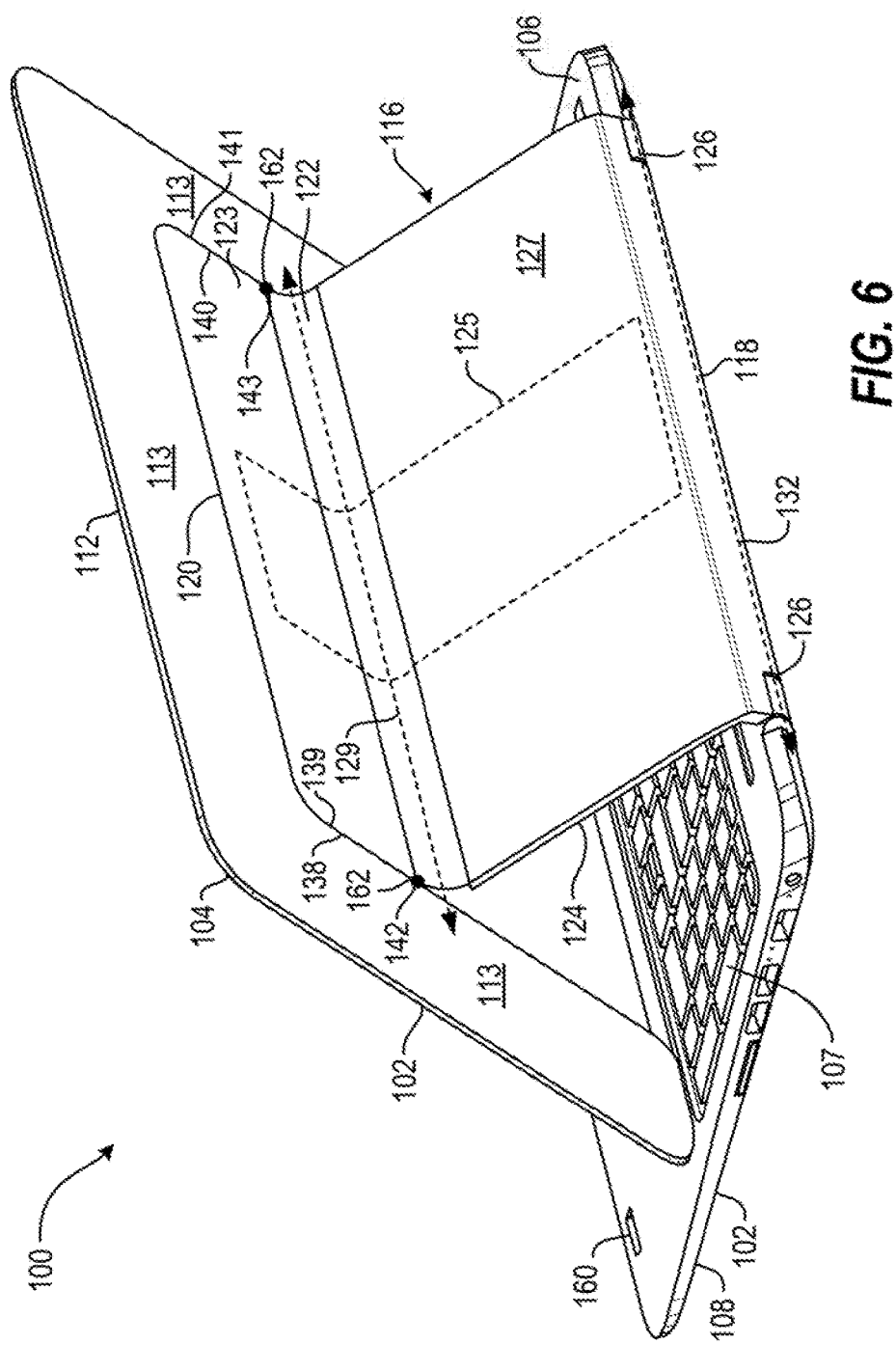
FIG. 6 is a perspective view of a computing device is a rear position of a tablet mode according to some examples.

The computing device 100 may be transitioned between the closed mode and the laptop mode by rotating the display member 104 relative to the base member 102 about a pivotal axis of rotation 132 using the hinges 126. Additionally, the computing device 100 may be transitioned between the laptop mode and the tablet mode by rotating the display member 104 relative to the base member 102 about a pivotal axis of rotation 129 using the flexible hinge 122. Additionally, the transition between the laptop mode and the tablet mode may include rotating the display member 104 relative to the base member 102 about the pivotal axis of rotation 132 using the hinges 126. In some examples, the transition between the laptop mode and the tablet mode may be made by rotating the display member 104 relative to the base member 102 about the pivotal axes 129 and 132 using the flexible hinge 122 and hinges 126. In some examples, rotation may be performed about both pivotal axes 129 and 132 simultaneously. The pivotal axes 129 and 132 may be longitudinal axes. Example pivotal axes 129 and 132 are shown in FIG. 6.

In the closed mode, the display member 104 may be stacked in parallel on the base member 103 such that the display screen 114 and the keyboard 107 may be facing inwardly toward each other. In the laptop mode, the display member 104 may be oriented at an angle relative to the base member 102 to allow the user to view a display screen 114. In the tablet mode, the display member 104 may be oriented such that the display screen 114 is facing outwardly away from the base member 102, and such that the keyboard 107 is facing inwardly toward the display member 104.

The display attachment portion 123 may be attached to the display member 104. For example, the display attachment portion 123 may be may be stacked onto and in parallel with the display member 104, and may be rigidly attached by an adhesive such as an epoxy resin. The plate attachment portion 127 may be attached to the rigid plate 124, the hinges 126, and/or the base member 102. For example, the plate attachment portion 127 may be may be stacked onto and in parallel with the rigid plate 124, and may be rigidly attached to the rigid plate 124, hinge 126, and/or base member 102 by an adhesive such as an epoxy resin.

The flexible hinge 122 may be included between and attached to the display attachment portion 123 and the plate attachment portion 127. For example, the flexible hinge 122 may be rotatably attached to the display attachment portion 123 at and between the points 142 and 143. The flexible hinge 122 may, in some examples, be exposed in that it may not be covered by a housing. The flexible hinge 122, display attachment portion 123, and the plate attachment portion 127 may be each be planar, however they do not necessarily need to be planar. The flexible hinge 122 may be a "flexible sheet", which is a flexible element having a thickness that is small relative to its length and width. The flexible sheet may be flat in that it does not include protrusions or recesses, but this is not necessary. The flexible sheet may be rectangular, but this is not necessary. In some examples, the flexible hinge 122 may be made of a flexible polymer, for example nylon, polypropylene, and/or other flexible polymers. In some examples, any of the polymers above may have a Young's modulus of about 1.5 to about 4 gigapascals, or about 2 to 3 gigapascals. In some examples, the flexible hinge 122 may be made of a flexible metal, for example, steel such as spring steel and/or stainless steel, and/or other flexible metals. In some examples, any of the steels above may have a Young's modulus of between about 100 to about 300 gigapascals, or between about 180 to about 220 gigapascals. In some examples, the flexible hinge 122 may be made of a combination of a polymer and a metal.

In some examples, a threshold force of about 2 newtons, or between about 0.5 to about 4 newtons, may be required to cause the flexible hinge 122 to begin bending from its biased state, which will be discussed. However, in other examples, no such threshold force may be required to begin bending the flexible hinge 122. In some examples, once the flexible hinge 122 begins bending, the flexible hinge 122 may have a rotational stiffness of about 0.6 newton-meters per radian, or between about 0.15 newton-meters per radian to about 1.3 newton-meters per radian, or between about 0.3 newton-meters per radian to about 0.9 newton-meters per radian, wherein the rotational stiffness is equal to the applied torque divided by the angle of rotation.

In some examples, the flexible hinge 122 may include a kerf bend to add flexibility. In some examples, the flexible hinge 122 may have a length between the display and plate attachment portions 123 and 127 of between about 3 centimeters to about 20 centimeters, or between about 5 to about 10 centimeters. In some examples, the flexible hinge 122 may have a width along the pivotal axis 129 of FIG. 6 of between about 15 centimeters to about 40 centimeters, or between about 25 to 30 centimeters. In some examples, the flexible hinge 122 may have a thickness perpendicular to the length and width of between about 0.5 millimeters to about 25 millimeters, between about 0.5 to about 10 millimeters, or between about 0.5 to about 5 millimeters, or between about 1 to about 3 millimeters.

Figure 4:
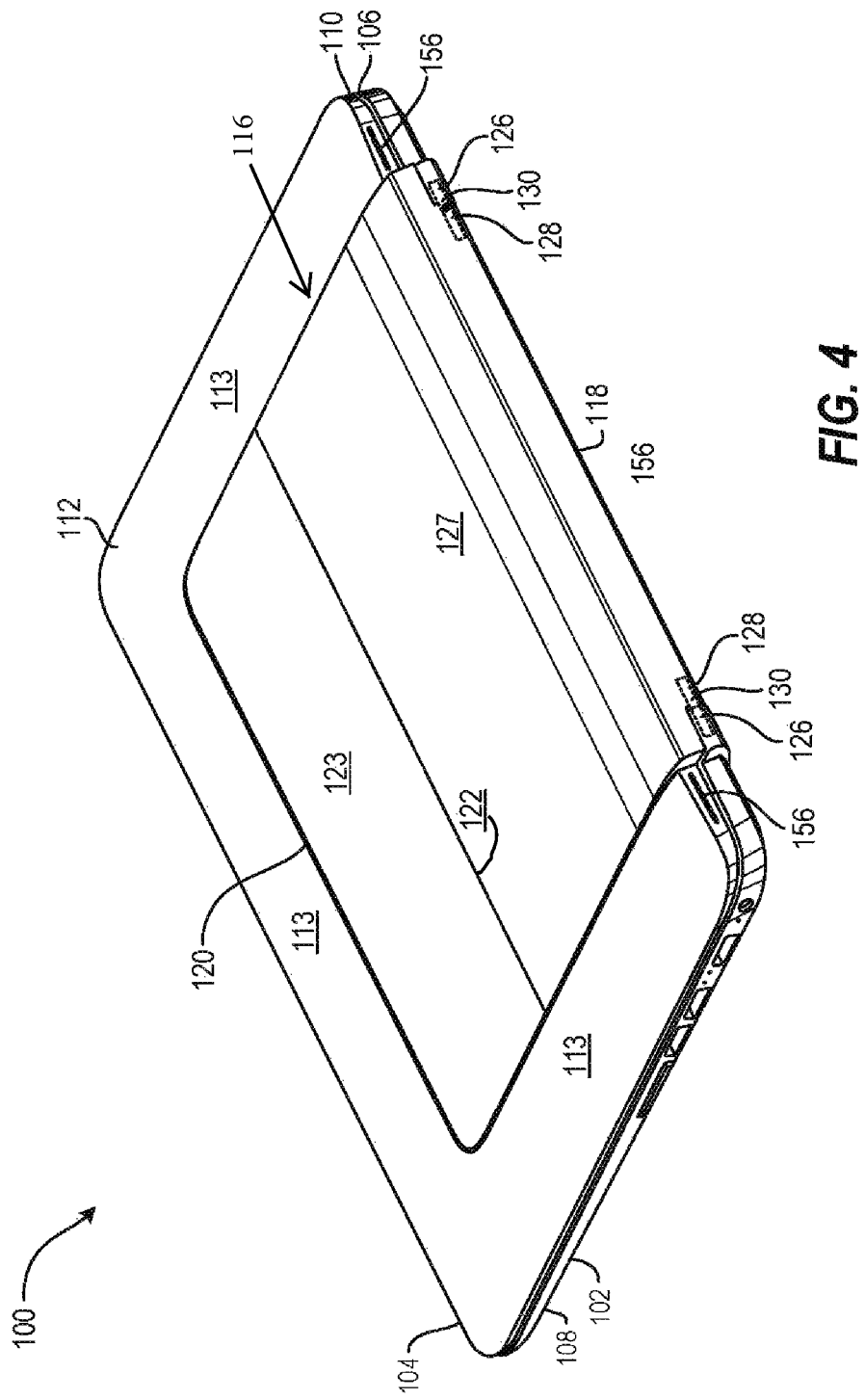
FIG. 4 is a perspective view of a computing device in a closed mode according to some examples.
Figure 5:
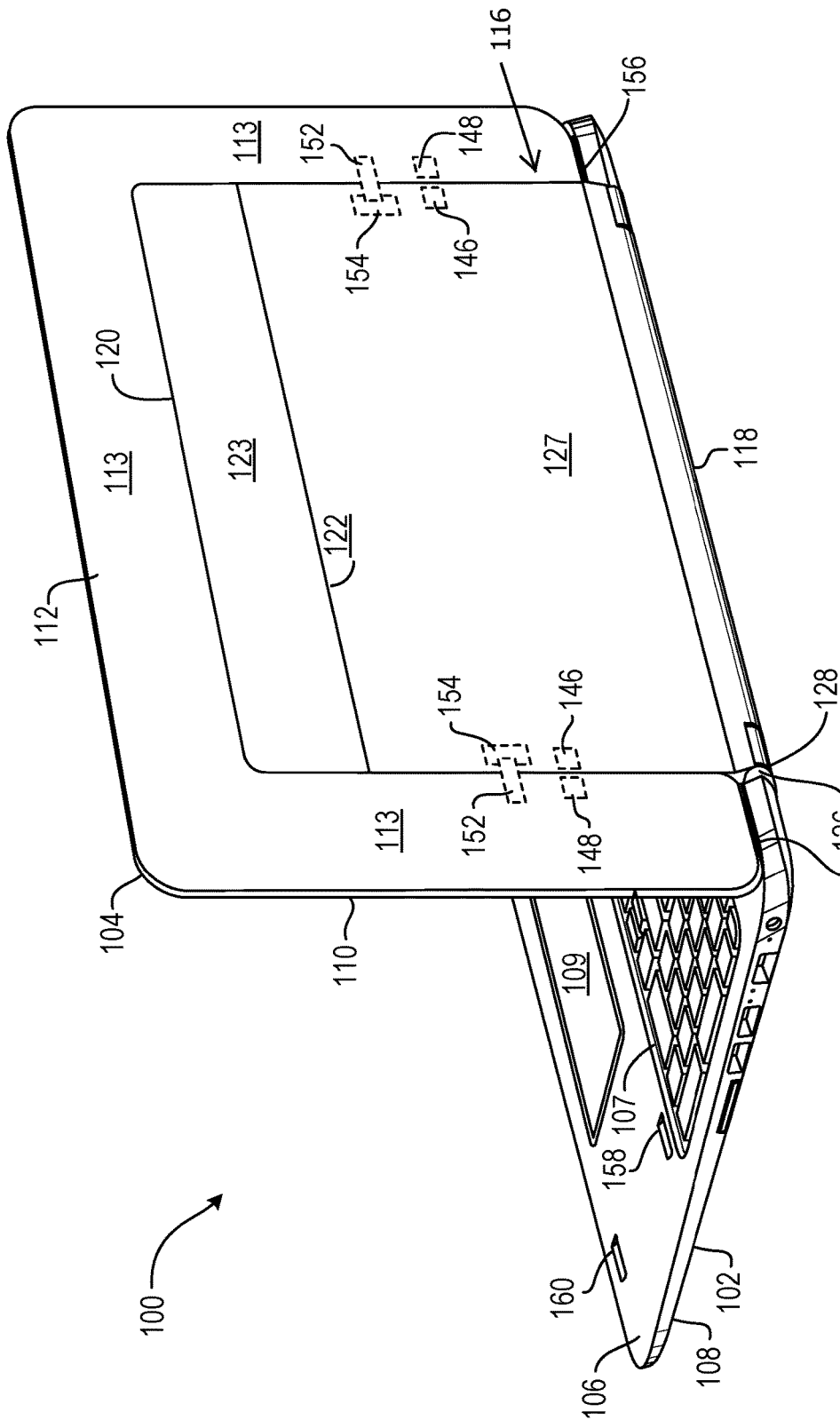
FIG. 5 is a perspective view of a computing device in a laptop mode according to some examples.
Figure 7:
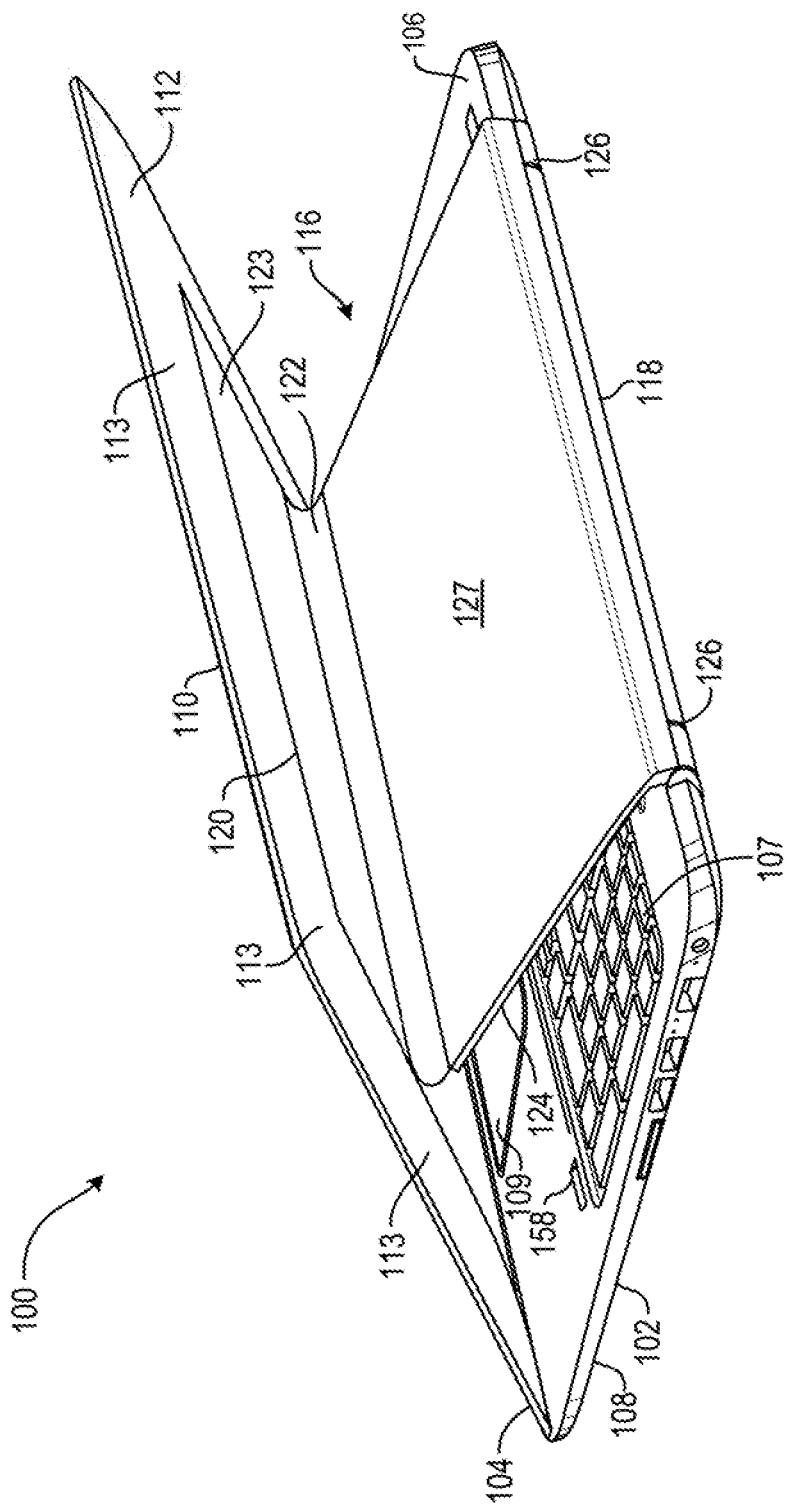
FIG. 7 is a perspective view of a computing device in a front position of a tablet mode according to some examples.
Figure 8:
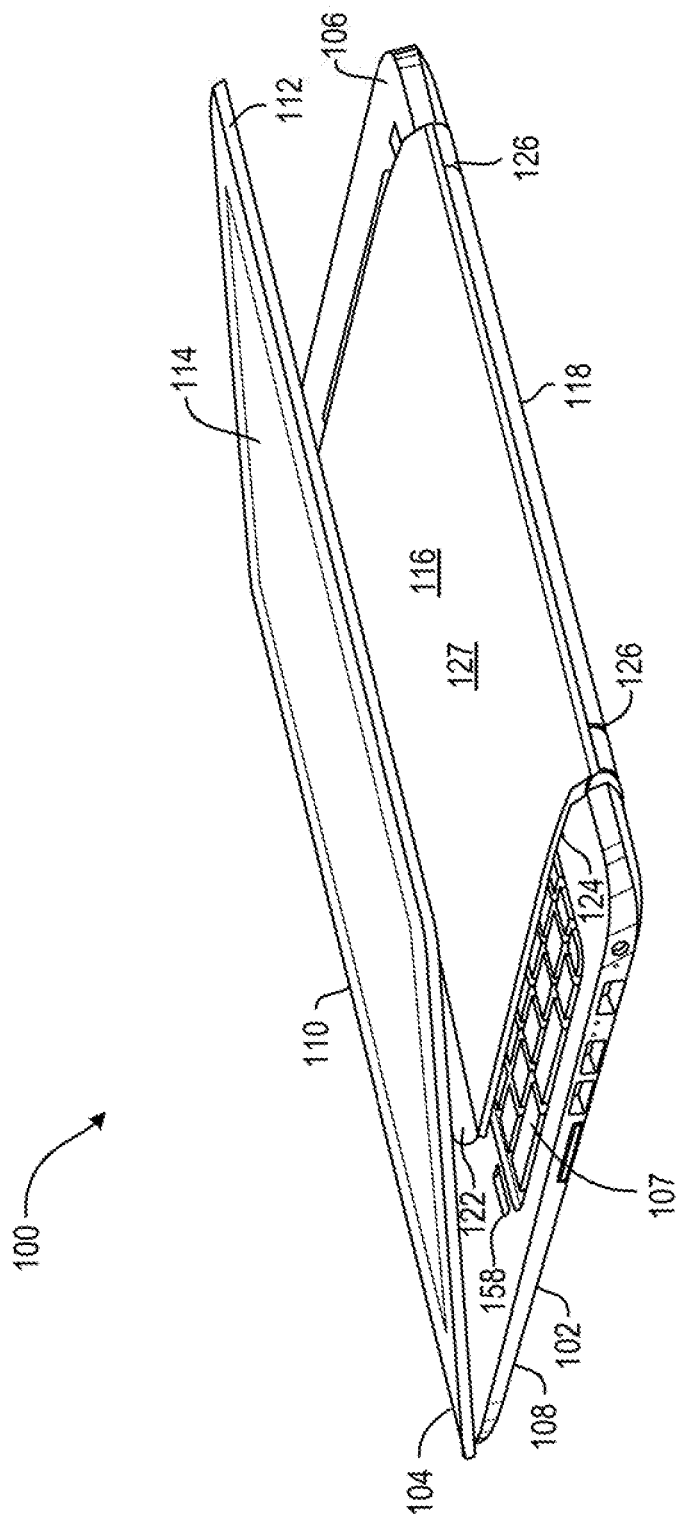
FIG. 8 is a perspective view of a computing device in a compressed position of a tablet mode according to some examples.

Rotation of the display member 104 about the pivotal axis of rotation 129 may be accomplished by bending the flexible hinge 122 from the unbent configuration of FIG. 5 into any of the bent configurations shown in FIGS. 6-8. For example, the end of the flexible hinge 122 that is opposite to the end attached to the display attachment portion 123, such as the end attached to the plate attachment portion 123, may bend away from the display member 104. In some examples, the flexible hinge 122 may have a maximum curvature, such as the U-shaped curve in the compressed position of FIG. 8. In some examples, the flexible hinge 122 may be biased toward the unbent configuration as shown in FIGS. 4-5. In these examples, the bent configurations of the tablet mode in FIGS. 6-8 may be maintained by the weight of the display member 104 and/or by locating elements, as will be discussed in more detail. In other examples, the flexible hinge 122 may be biased toward any one of the bent configurations of FIGS. 6-8. In these examples, the unbent configurations of FIGS. 4-5 may be maintained by fasteners, as will be discussed in more detail. However, one or both of the locating elements and fasteners may be included to add stability regardless of the biasing choice of the flexible hinge 122.

The second side 122 of the display member 104 may include a display cover 113. In some examples, the flexible hinge 122, the display attachment portion 123, the plate attachment portion 127, and the display cover 113 may be made as an integral, one-piece construction and/or may be made of the same materials such as the materials described above relative to the flexible hinge 122. In some examples, these elements may be co-molded and/or may have the same thickness. The flexible hinge 122, the display attachment portion 123, the plate attachment portion 127, and the display cover 113 may cover the entire second side 122 of the display member 104 to provide a seamless finish when the computing device 100 in the closed mode and the laptop mode, as shown in FIGS. 4-5. However, in some examples, these elements may be separate pieces and/or may be made of different materials relative to each other.

Slits 138 and 140, shown in FIG. 6, be included on either side of the hinge assembly 116 to facilitate transitioning between the laptop and tablet modes by allowing the hinge assembly 116 to rotate and flex relative to the display member 104. For example, the slits 138 and 140 may respectively be cut to the left and to the right of the flexible hinge 122, the plate attachment portion 127, and at least part of the plate attachment portion 127. The slits 138 and 140 may begin at points 139 and 141 and may extend to the points 142 and 143 between the display attachment portion 123 and the flexible hinge 122, and through to the remainder of the length on the second side 122 of the display member 104. Inclusion of the slits 138 and 140 at the sides of the display attachment portion 123 may, in some examples, prevent tears in the display cover 113 and/or flexible hinge 122 due to repeated transitioning between the laptop and tablet modes.

The rigid plate 124 may have suitable dimensions and be made of suitable materials to provide stiffening and/or structural reinforcement to the hinge assembly 116, and/or to aid in rotation of the display member 104 relative to the base member 102. The rigid plate 124 may have opposing surfaces, each of which may be planar. However, the surfaces do not necessarily need to be planar. The rigid plate 124 may be made of a metal such as a steel, for example stainless steel or spring steel. In some examples, the rigid plate 124 may be thicker than the attachment portion 127 and flexible hinge 122. However, in other examples, the rigid plate 124 may have substantially the same thickness as the flexible hinge 122. In any of these examples, the rigid plate 124 may have the same or substantially the same shape as the plate attachment portion 127 of the flexible hinge 122, such that the side edges of the rigid plate 124 may be flush with the side edges of the plate attachment portion 127. Inclusion of the rigid plate 124 may thus increase the overall thickness of the hinge assembly 116 where the rigid plate 124 and plate attachment portion 127 overlap. However, in some examples, the flexible hinge 122 may extend from the attachment portion 123 to the hinges 126, such that there may be no rigid plate 124 and plate attachment portion 127.

The cable 125, shown in FIG. 6, may extend through the flexible hinge 122 from the base member 102 to the display member 104 to provide electrical contact and data communications between the base member 102 and the display member 104. In some examples, including examples in which the flexible hinge 122 does or does not extend to the base member 102, part of the cable 125 may extend through the rigid plate 124. The cable 125 may, for example, be a ribbon cable. For example, the cable 125 may be a flexible flat cable (FFC), which is an electrical cable that is both flexible and flat, such as a flexible printed circuit (FPC). Thus, the cable 125 may be included in the flexible hinge 122 without increasing the thickness of the flexible hinge 122.

At the first end 118 of the hinge assembly 116, one or more hinges 126, such as friction hinges, may rotatably attach the base member 102 about the pivotal axis of rotation 132 to the remainder of the elements of the hinge assembly 116 including the rigid plate 124, plate attachment portion 127, and flexible hinge 122. A "friction hinge" is a hinge having a frictional interference fit between its rotating elements. For example, each friction hinge 126 may include an annular gudgeon member 128 and a cylindrical pintle member 130 longitudinally inserted through the gudgeon member 128 along the pivotal axis 132. The pintle member 130, shown in FIG. 4, may frictionally engage the inner surface of the gudgeon member 128 by way of an interference fit wherein the inner surface may exert an inward radial force on the pintle member 130, which may exert a reciprocal outward force on the inner surface. The frictional engagement of these cylindrical mating surfaces may allow the angular position between the hinge assembly 116 and the base member 102 to be maintained or held in place at any desired angle, wherein the permitted range of angles may be between a minimum angle of zero degrees and a maximum angle of 180 degrees, for example. In some examples, the hinges 126 may be made of a metal such as spring steel or stainless steel, or other materials, or combinations thereof.

In examples in which the computing device 100 does not have a closed mode, the hinges 126 may not rotate sufficiently to transition the computing device 100 from the laptop mode to the closed mode. Thus, for example, the computing device 100 may instead be stowed away in the tablet mode.

The computing device 100 may include one or more fasteners to secure the hinge assembly 116 in the display member 104 when the computing device 100 is in the closed mode or the laptop mode. For example, the computing device 100 may include one or more of magnetic fasteners, mechanical fasteners, and other types of fasteners.

In some examples, each magnetic fastener may include a magnetic member 146 in the rigid plate 124 and a magnetic member 148 in the display member 104, as shown in FIG. 5. When the magnetic members 146 and 148 are in proximity, for example when the computing device 100 is in the closed mode or the laptop mode, the magnetic members 146 and 148 may be sufficiently attracted such that the hinge assembly 116 is held in place in the display member 104. The hinge assembly 116 and display member 104 may be pulled away from each other to transition the computing device 100 to the tablet mode, such that the magnetic members 146 and 148 are no longer in proximity and thus are no longer sufficiently attracted to hold the hinge assembly 116 in the display member 104. As shown in FIG. 5, a magnetic fastener may be included in each side of the display member 104. In some examples, the magnetic members 148 may be included in the flexible hinge 122 or attachment portion 127 rather than in the rigid plate 124. A "magnetic member" is any object made of a suitable material such that it experiences a force in the presence of a magnetic field, and/or itself generates a magnetic field. In some examples, one of both of the magnetic members 146 and 148 may be a permanent magnet such as a ferromagnet. In some examples, one or both of the magnetic members 146 and 148 may be an antiferromagnet, a ferrimagnet, a paramagnet, a diamagnet, an electromagnet magnetized by current provided by the computing device 100, or other magnetic member. In some examples, one of the magnetic members 146 or 148 may be a permanent magnet, and the other may be any suitable metallic element.

In some examples, each mechanical fastener may include a latch member 152 on the display member 104 and a receiving member 154 on the attachment portion 127. The hinge assembly 116 may be moved into the display member 104, and the latch member 152 may be inserted into the receiving member 154 to lock the hinge assembly 116 into the display member 104, as shown in FIG. 5. In some examples, the latch member 152 may instead be on the attachment portion 127 and the receiving member 154 may instead be on the display member 104. In other examples, one of the latch member 152 or receiving member 154 may instead be on a different part of the hinge assembly 116, such as on the flexible hinge 122, rather than on the attachment portion 127.

In some examples, the lower front edge of the display member 104 may hover over the base member 102 in the tablet mode. In other examples, the display member 104 may contact any position of the base member 102, along a continuum between the laptop mode of FIG. 5, the rear position of the tablet mode of FIG. 6, and the front position of the tablet mode of FIG. 7, and the compressed position of FIG. 8. The contact may, in some examples, provide additional stability.

In some of the examples in which the front edge of the display member 104 contacts the base member 102, various locating elements may be included in the base member 102 and/or the display member 104 to locate the display member 104 relative to the base member 102 in one or more positions. Thus, additional stability may be provided to the display member 104, such that if a user pushes against the display screen 114, the display member 104 may not move relative to the base member 102.

In some examples, the locating elements may include protrusions 156, shown in FIG. 5, on the bottom of the display member 104, and recesses 158 and 160 in the base member 102. In some examples the protrusions 156 may have thicknesses suitable such that they may be inserted into one or more recesses 158 or 160 to locate the display member 104 in the base member 102 at various positions, as shown in FIGS. 4 and 5. For example, two recesses 158, one of which is shown in FIGS. 5, 7, and 8, may be included between the keyboard 107 and touchpad 109 of the base member 102 to allow two corresponding protrusions 156 to be inserted therein to locate the display member 104 and base member 102 in the rear position of the tablet mode, as shown in FIG. 4. Additionally, two recesses 160, one of which is shown in FIGS. 5 and 6, may be included at the front of the base member 102 to allow the two corresponding protrusions 156 to be inserted therein to locate the display member 104 and base member 102 in the front position of the tablet mode, as shown in FIG. 5. The second recess 158 and second recess 160 may be on the other side of the base member 102.

In other examples, for example those in which there are no protrusions 156, the display member 104 may have a thickness suitable such that the display member 104 may be directly inserted into recesses to locate the display member 104 in the base member 102. For example, one longitudinal recess may be included between the keyboard 107 and touchpad 109, and may extend between the entire length of the base member 102 between the left and right sides of the base member 102 to locate the display member 104 and base member 102 in the rear position of the tablet mode. Another longitudinal recess may be included at the front of the display member 104 and may extend between the entire length of the base member 102 between the left and right sides of the base member 102 to locate the display member 104 and base member 102 in the front position of the tablet mode.

In some examples, the locating elements may include protrusions on the base member 102. For example, one or more protrusions may be included between the keyboard 107 and touchpad 109, and may operate as stops to locate the display member 104 and base member 102 in the rear position of the tablet mode. Additionally, one or more protrusions may be included at the front of the base member 102, and may operate as stops to locate the display member 104 and base member 102 in the front position of the tablet mode.

In further examples, the locating elements may include magnetic members. One or more magnetic members may be included in the bottom of the display member 104. One or more magnetic members may be included between the keyboard 107 and touchpad 109, and may attract the one or more magnetic members of the display member 104 to locate the display member 104 and base member 102 in the rear position of the tablet mode. Additionally, one or more magnetic members may be included at the front of the base member 102, and may attract the one or more magnetic members of the display member 104 to locate the display member 104 and base member 102 in the front position of the tablet mode. In some examples, any of the magnetic members may be a permanent magnet such as a ferromagnet. In some examples, any of the magnetic members may be an antiferromagnet, a ferrimagnet, a paramagnet, a diamagnet, an electromagnet magnetized by current provided by the computing device 100, or other magnetic member. In some examples, the magnetic member of the display member 104 may be a permanent magnet, and the magnetic member of the base member 102 may be any suitable metallic element. In same examples, the magnetic member of the base member 102 may be a permanent magnet, and the magnetic member of the display member 104 may be any suitable metallic element.

In some examples, the locating elements may include detents in the display member 104. For example, one or more detents 162 may be included at each of the points 142 and 143, as shown in FIG. 6. The detents 162 may allow up to a certain angle of rotation between the flexible hinge 122 and the display member 104, but may not allow any further rotation. The maximum angle may be between about 30 and about 40 degrees, about 40 and about 50 degrees, about 50 and about 60 degrees, about 60 and about 70 degrees, about 70 and about 80 degrees, and/or about 80 and 90 degrees.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A computing device comprising:
a base member comprising a keyboard, a user-activatable input region, a first recess between the keyboard and the user-activatable input region, and a second recess between the first recess and a front side of the base member, the front side facing a user when the computing device is in a tablet mode;
a display member comprising a protrusion, wherein engagement of the protrusion with the respective first and second recesses correspond to different positions of the tablet mode of the computing device, wherein when the protrusion is engaged in the first recess the display member covers the keyboard;
a rigid plate;
a first hinge attached between the base member and the rigid plate to rotate the base member relative to the rigid plate about a first pivotal axis of rotation;
a second hinge attached between the display member and the rigid plate, the second hinge comprising a flexible metal sheet or a flexible polymer sheet to bend about a second pivotal axis of rotation to rotate the display member relative to the rigid plate about the second pivotal axis to transition the computing device between a laptop mode and the tablet mode, wherein the rigid plate includes a first fastener, and the display member includes a second fastener to fasten to the first fastener when the base member and the display member have been rotated to the laptop mode, the rigid plate parallel with a back surface of the display member in the laptop mode.

2. The computing device of claim 1, wherein in the laptop mode the base member and the display member are angled with respect to one another.

3. The computing device of claim 1, wherein the flexible polymer comprises nylon or polypropylene.

4. The computing device of claim 1, wherein the flexible metal sheet comprises spring steel or stainless steel.

5. The computing device of claim 1, wherein the first hinge is to rotate the base member and the display member relative to each other about the first pivotal axis to transition the computing device between the laptop mode and a closed mode.

6. The computing device of claim 1, further comprising a flexible flat cable in the second hinge.

7. The computing device of claim 1, wherein the second hinge has a rotational stiffness of between 0.15 and 1.3 newton-meters per radian.

8. The computing device of claim 1, wherein the rigid plate has a thickness greater than a thickness of an attachment portion of a hinge assembly that attaches to the rigid plate, the hinge assembly comprising the first and second hinges.

9. The computing device of claim 8, wherein the first hinge is a friction hinge.

10. The computing device of claim 1, wherein the first fastener includes a first magnetic fastener, and the second fastener includes a second magnetic fastener to fasten to the first magnetic fastener when the base member and the display member have been rotated to the laptop mode of the computing device.

11. The computing device of claim 1, wherein the user-activatable input region is a touchpad.

12. The computing device of claim 1, wherein when the protrusion is engaged in the second recess the display member covers the keyboard and the user-activatable input region.

* * * * *